(12) United States Patent
Besse et al.

(10) Patent No.: US 12,264,637 B2
(45) Date of Patent: Apr. 1, 2025

(54) PROPULSION SYSTEM WITH DOWNSTREAM SECTION HAVING DEFORMABLE SHAPE-MEMORY MATERIAL AND ACTUATORS EXTENDING IN DIFFERENT CONSECUTIVE ANGULAR SECTORS

(71) Applicants: SAFRAN, Paris (FR); SAFRAN HELICOPTER ENGINES, Bordes (FR)

(72) Inventors: Jean-Louis Robert Guy Besse, Moissy-Cramayel (FR); Ye-Bonne Karina Maldonado, Moissy-Cramayel (FR)

(73) Assignees: SAFRAN, Paris (FR); SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/754,758

(22) PCT Filed: Oct. 12, 2020

(86) PCT No.: PCT/FR2020/051799
§ 371 (c)(1),
(2) Date: Apr. 11, 2022

(87) PCT Pub. No.: WO2021/074515
PCT Pub. Date: Apr. 22, 2021

(65) Prior Publication Data
US 2024/0084761 A1    Mar. 14, 2024

(30) Foreign Application Priority Data
Oct. 16, 2019 (FR) ...................... 1911538

(51) Int. Cl.
*F02K 1/00* (2006.01)
*B64C 15/02* (2006.01)

(52) U.S. Cl.
CPC .............. *F02K 1/002* (2013.01); *B64C 15/02* (2013.01); *F05D 2270/64* (2013.01); *F05D 2270/65* (2013.01); *F05D 2300/505* (2013.01)

(58) Field of Classification Search
CPC ......... B64C 15/00; B64C 15/02; F02K 1/002; F02K 1/004; F02K 1/06; F02K 1/006;
(Continued)

(56) References Cited

U.S. PATENT DOCUMENTS 3,988,889 A * 11/1976 Chamay .................... F02K 1/66
60/771
4,049,199 A    9/1977 Nightingale
(Continued)

FOREIGN PATENT DOCUMENTS

| EP | 2184481 A2 | 5/2010 |
| FR | 2310471 A1 | 12/1976 |

OTHER PUBLICATIONS

International Search Report received for PCT Patent Application No. PCT/FR2020/051799, mailed on Jan. 11, 2021, 6 pages (2 pages of English Translation and 4 pages of Original Document).

*Primary Examiner* — Joshua J Michener
*Assistant Examiner* — Arfan Y. Sinaki
(74) *Attorney, Agent, or Firm* — WOMBLE BOND DICKINSON (US) LLP

(57) ABSTRACT

The invention relates to a propulsion system (1, 1') for an aircraft, comprising a rotor (2) and a nacelle failing (3) that extends around said rotor in relation to an axis (X) and includes an upstream portion (10) forming an inlet section (BA) of the nacelle fairing (3) as well as a downstream portion (20), a downstream end (21) of which forms an outlet section (BF) of the nacelle fairing (3); and characterized in that the downstream portion (20) has a radially inner wall (20a) and a radially outer wall (20b), both of which are made of a deformable shape memory material, and in that the downstream end (21) includes pneumatic or hydraulic actuators (23, 23') extending in different consecutive angular sectors about said axis (X), each actuator being independently actuatable and being configured to deform, in a direction that extends radially in relation to said axis (X) and is centered angularly in relation to its angular sector, under the effect of a predetermined control pressure.

9 Claims, 5 Drawing Sheets

(58) Field of Classification Search
CPC .............. F02K 1/008; F02K 1/10; F02K 1/12; F05D 2300/505
See application file for complete search history.

(56) References Cited

U.S. PATENT DOCUMENTS

| | | | | |
|---|---|---|---|---|
| 4,492,353 | A | * | 1/1985 | Phillips .............. B64C 29/0075 244/12.4 |
| 5,328,098 | A | | 7/1994 | Barcza et al. |
| 10,260,427 | B2 | * | 4/2019 | Buey ........................ F02K 3/075 |
| 2002/0073691 | A1 | * | 6/2002 | Rey .......................... F03G 7/065 60/226.1 |
| 2003/0126856 | A1 | * | 7/2003 | Lair ......................... F02K 1/383 60/770 |
| 2004/0197519 | A1 | * | 10/2004 | Elzey ...................... B32B 33/00 428/116 |
| 2006/0000211 | A1 | * | 1/2006 | Webster .................. F03G 7/065 60/527 |
| 2009/0208328 | A1 | * | 8/2009 | Stern ......................... F02K 1/10 60/226.3 |
| 2010/0037588 | A1 | * | 2/2010 | Baltas ..................... F02K 1/386 60/226.3 |
| 2010/0139240 | A1 | * | 6/2010 | Levasseur ............... F02K 1/085 60/226.3 |
| 2011/0030380 | A1 | | 2/2011 | Widdle, Jr. et al. |
| 2011/0147533 | A1 | * | 6/2011 | Goossen ................ B64C 11/001 415/13 |
| 2011/0217170 | A1 | * | 9/2011 | Buffone .................... B64C 3/48 416/128 |
| 2014/0027538 | A1 | * | 1/2014 | Webster .................... B64C 3/46 239/265.43 |

* cited by examiner

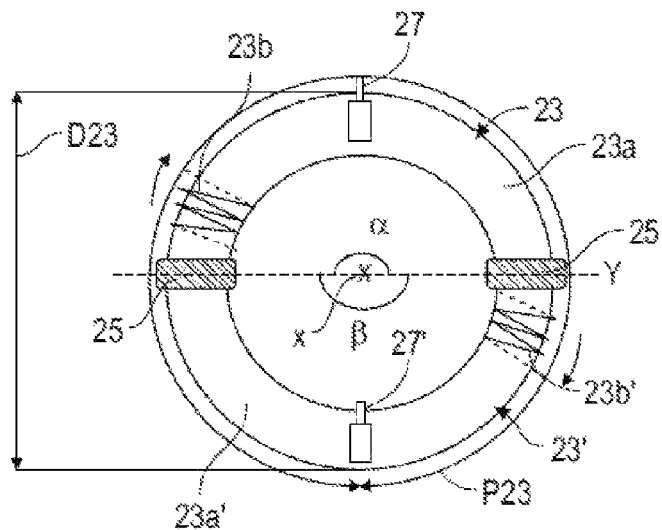 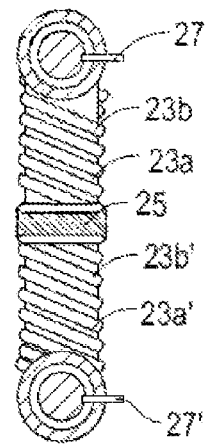
FIG. 5A          FIG. 5B
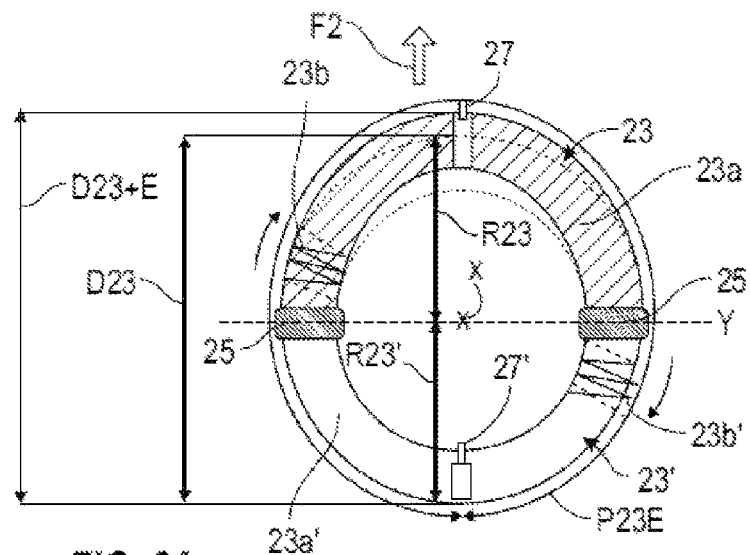 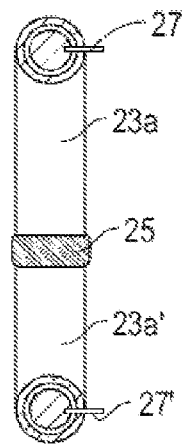
FIG. 6A          FIG. 6B

PROPULSION SYSTEM WITH DOWNSTREAM SECTION HAVING DEFORMABLE SHAPE-MEMORY MATERIAL AND ACTUATORS EXTENDING IN DIFFERENT CONSECUTIVE ANGULAR SECTORS

TECHNICAL FIELD

The present invention relates to the field of the propulsion systems for aircraft. In particular, it relates to a propulsion system capable of providing a lateral thrust component.

The present invention also relates to an aircraft comprising such a propulsion system.

PRIOR ART

The technical background comprises in particular the documents US 2011/030380 A1, EP 2184481 A2, U.S. Pat. No. 5,328,098 A1 and FR 2310471 A1.

A propulsion system for aircraft comprises at least one rotor or a propeller comprising a plurality of blades mounted on a rotating shaft.

There are aircrafts, and in particular Vertical Take-Off and Landing Aircrafts (VTOL), with propulsion systems with single-rotor when they comprise only one rotor or counter-rotating when they comprise rotors grouped in pairs turning in opposite directions.

These propulsion systems are either with shrouded rotors (the rotor is then surrounded by an annular nacelle fairing), or with free rotors, the propulsion systems and in particular the rotors (free or shrouded) being able to be mounted on a pivot shaft allowing the orientation of the propulsion systems and thus of the rotors between a vertical position and a horizontal position, for example the vertical orientation for a vertical take-off or a vertical landing and the horizontal orientation for forward flight or airplane flight mode.

The shrouded rotors offer several interesting advantages, such as:
- a significant reduction in the sound signature of the rotor in direct emission;
- a protection of the blades of the rotor from surrounding obstacles;
- an improvement in the performance of the rotor, in particular in hovering flight of the aircraft or at low forward speed.

However, the VTOL aircraft with shrouded rotors, in particular in hovering flight, do not have the same manoeuvrability as the conventional helicopters.

For conventional helicopters, altitude and placement corrections can be made, in the X, Y, Z aeronautical standards reference trihedron, by:
- corrections around the roll axis X (axis of rotation of the helicopter around its longitudinal axis) by a left or right action on the cyclic pitch (acting on the orientation of the thrust of the rotor, here in a plane perpendicular to the axis X);
- corrections around the pitch axis Y (axis of the helicopter around its transverse axis) by an action forward (nose down) or backward (nose up) on the cyclic pitch (acting on the orientation of the thrust of the rotor, here in a plane perpendicular to the axis Y);
- corrections around the yaw axis Z (axis of rotation in a horizontal plane of the helicopter around its vertical axis) by action on the rudder (acting on the thrust of the anti-torque rotor of the helicopter);
- corrections in longitudinal translation along the axis X of the reference trihedron in aeronautical standards (longitudinal axis) by a command of the cyclic/collective pitch (acting on the orientation of the thrust of the rotor, here forward or backward);
- corrections in lateral translation according to the axis Y of the reference trihedron in aeronautical standards (transverse axis) by a command of the cyclic/collective pitch, (acting on the orientation of the thrust of the rotor, here towards the right or the left);
- corrections in vertical translation along the reference axis Z by a command of the collective pitch upwards, downwards (acting on the thrust of the rotor, setting pitch: command pulled upwards).

Of course, coordinated corrections of the collective pitch and of the rudder, well known to pilots, are required to counter the induced effects of loss of lift component and torque effect.

For the VTOL aircrafts with shrouded rotors, the positioning corrections, or the corrections allowing to counteract gusty winds in hovering flight, are usually complex and make the flight uncomfortable for the passengers of the aircraft.

For example, in the case of a quadrotor aircraft (i.e. an aircraft with four rotors), in order to make a correction in the direction of the reference axis X, it is necessary to tilt the aircraft forward about the reference axis Y (along the pitch axis), then to make a correction of the position reached (for example to counter a gust of wind) and to return quickly to a neutral position, referred to as "flat". Similarly, in order to make a correction in the direction of the reference axis Y, it is necessary to tilt, i.e. roll, the aircraft towards and around the reference axis X (along the roll axis), then make a correction of the position reached and quickly return to a neutral position. With such a quadrotor, when transporting passengers, the latter may experience front/back and/or right/left sways.

A gas turbine engine has been proposed comprising a two-dimensional nozzle comprising a flexible panel adapted to change position, under the action of a cylinder, so as to regulate the exhaust of the engine.

Gas turbine engines comprising variable geometry nozzles have also been proposed, so that an outlet surface area of the nozzle can be varied.

Thus, these proposed solutions propose nozzles in which the two-dimensional vector thrust technology is implemented.

However, none of these proposed solutions proposes the implementation of three-dimensional vector thrust technology in the nacelle fairings of propulsion systems, in particular in the VTOL mode with rotors, guiding the flow resulting from said rotors.

There is therefore a need to provide a simple and effective solution to the above-mentioned problems.

One purpose of the present invention is to provide a solution allowing to improve the maneuverability of the VTOL aircrafts, while reducing the weight and aerodynamic loss impacts associated with the flight commands.

In particular, the invention proposes to improve the maneuverability of the VTOL aircrafts by providing a propulsion system capable of providing a thrust component lateral to the axis of the rotors.

SUMMARY OF THE INVENTION

To this end, the invention relates to a propulsion system for an aircraft, comprising at least one rotor and a nacelle fairing extending around said at least one rotor with respect to an axis of rotation of said rotor, said nacelle fairing comprising an upstream section forming an inlet cross-section of the nacelle fairing and a downstream section, a downstream end of which forms an outlet cross-section of the nacelle fairing; and characterised in that the downstream section comprises a radially internal wall and a radially external wall made of a deformable shape-memory material, and in that the downstream end forming the outlet cross-section comprises a plurality of pneumatic or hydraulic actuators, the actuators extending in different consecutive angular sectors about said axis of rotation, each actuator being actuatable independently of the other actuators and being configured to deform in a direction which is radial with respect to the axis of rotation and which is angularly centred with respect to the angular sector over which it extends, under the effect of a predetermined command pressure.

The propulsion system according to the invention can be with single rotor or counter-rotating rotors, installed in a stationary or pivoting nacelle, with a through or offset pivoting axis.

According to the invention, the fairing is made of a semi-deformable shape memory material at its air outlet and of a plurality of pneumatic or hydraulic actuators configured to automatically vary the shape of the nacelle and hence the orientation of the air flow at its outlet, in order to manoeuvre the aircraft on which said nacelle is installed.

The profile of the fairing advantageously has a semi-rigid downstream portion whose dimensions and shape of the trailing edge outlet cross-section can be varied, so that the trailing edge outlet cross-section can be oriented laterally under the effect of a controlled device, to form a current tube producing a thrust with a lateral component, referred to as vector or oriented thrust.

The propulsion system according to the invention thus allows to improve the maneuverability of the aircraft in which it is installed, in particular during manoeuvres at low forward speed, such as take-offs and landings, while minimizing the noise pollution induced by the rotor of the propulsion system and ensuring a safety of this rotor by the presence of the nacelle fairing.

In fact, the shape of the fairing is continuously adapted according to the deflection of the controlled thrust to obtain a precise placement of the aircraft. The profile of the fairing can thus be oriented laterally according to the mechanical constraints of the flight sought in VTOL mode, so as to produce a thrust component perpendicular to the rotor axis.

The pneumatic actuator system can advantageously be locked, for example by a controlled opening/closing valve, once the command pressure has been established, and therefore does not consume energy once activated.

During the flight phases in airplane mode, the actuator system, which is useful during the phases with low forward speed, can be deactivated.

Each actuator may have a general shape of a toroidal segment. The actuators may extend in different consecutive angular sectors around said axis of rotation so that the set of the actuators has a general torus shape.

According to one embodiment, each actuator is made of radially stiffened elastic material including fibres.

According to another embodiment, each actuator comprises a bladder in the general form of toroidal segment of flexible material encased in a spiral spring. Each actuator can be embedded at one end in a rigid support. In particular, each spiral spring may be embedded at one end in a rigid support, and each bladder may be embedded at one end in a rigid support. Each bladder may comprise an inlet valve configured to receive the predetermined command pressure. The inlet valve can be a solenoid valve.

The plurality of actuators may comprise two actuators having a general semi-toroidal shape.

Advantageously, the propulsion system also comprises stiffening bridges connecting the radially internal and radially external walls of the downstream section and allowing to ensure a substantially constant distance between the radially internal and radially external walls of the downstream section.

The nacelle fairing may comprise an upstream section forming an inlet cross-section of the nacelle fairing and an intermediate section connecting the upstream and downstream sections.

Advantageously, the intermediate section is rigid and is connected by at least one mast to an engine of the propulsion system. This provides to the nacelle fairing of the propulsion system a rigid structure that can ensure a shielding function.

The present invention also relates to an aircraft characterised in that it comprises at least one propulsion system having at least one of the above-mentioned characteristics, the propulsion system being mounted so as to pivot on the aircraft by means of a pivot shaft that is offset from or passes through the rotor.

BRIEF DESCRIPTION OF THE FIGURES

The present invention will be better understood and other details, characteristics and advantages of the present invention will become clearer upon reading the following non-limiting example description, with reference to the attached drawings in which:

FIGS. 5A and 5B are schematic views, respectively rear and side, of an embodiment of the semi-toroidal actuators according to the invention, in axial thrust mode;

FIGS. 6A and 6B are schematic rear and side views, respectively, of an embodiment of the semi-toroidal actuators according to the invention, in asymmetrical thrust mode;

The elements having the same functions in the different embodiments have the same references in the figures.

DESCRIPTION OF THE EMBODIMENTS

In this disclosure, the terms "axial," "internal," and "external" are used in reference to the axis of rotation of the propulsion system according to the invention.

A propulsion system generally consists:
- of a nacelle;
- of an engine and its command and control system;
- and, in the case of a propeller or rotor propulsion, of its propeller or rotor or rotors.

The nacelle is the element which allows to integrate the engine with the aircraft, it is made up:
- of nacelle fairings (allowing to cover the engine, to shroud the rotors, to capture the air flow during the operation of the aircraft, to create a thrust effect, to reverse the thrust on the propulsion systems, etc.);
- of equipment to be mounted on the engine (such as the engine build-up unit EBU, including the electrical, hydraulic and pneumatic networks); and
- of the systems for attachment to the aircraft.

Figure 1A:
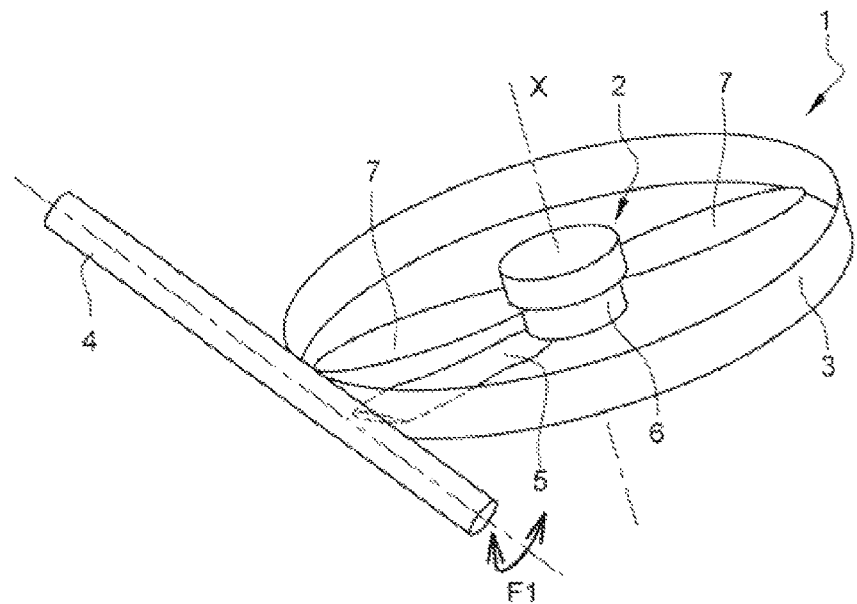
FIG. 1A is a schematic perspective view of a first embodiment a propulsion system shown with a nacelle mounted on an offset pivot axis, the propulsion system being in a horizontal position.
Figure 1B:
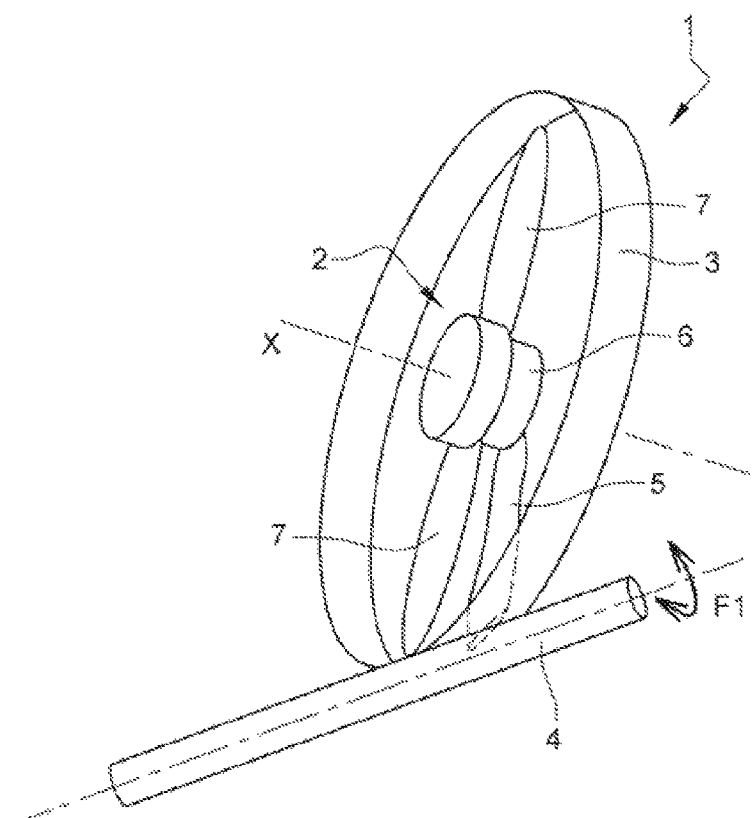
FIG. 1B is a view similar to FIG. 1A, showing the propulsion system in vertical position.

FIGS. 1A and 1B illustrate, in a simplified manner, a first embodiment of an aircraft propulsion system 1 according to the invention.

Here, the propulsion system 1 comprises at least one rotor 2 and one nacelle fairing 3 extending around said at least one rotor 2 with respect to a rotation axis X of the rotor 2. The fairing 3 advantageously acts, by its shape and its materials, as a sound barrier. The propulsion system can be fixedly mounted on the aircraft. The propulsion system 1 can also be mounted on a pivot shaft 4, offset from the axis of rotation X of the rotor 2. The pivot shaft 4 is attached by any means to the propulsion system 1, on the one hand, and to the aircraft, on the other hand, and allows the orientation of the propulsion system on the aircraft, authorizing the tilting of the propulsion system around the pivot shaft 4, according to the arrow F1, by means of known actuators, between a horizontal position as illustrated in FIG. 1A, and a vertical position as illustrated in FIG. 1B. This tilting allows the aircraft to be switched from a conventional aircraft mode to a VTOL or helicopter mode.

The rotor 2 of the propulsion system 1 is connected to the aircraft by a mast 5 supporting an engine 6, for example an electric motor, which drives the rotor 2 in rotation by means of a power shaft, in a manner known per se. According to the illustrated example in a non-limiting way, each rotor 2 comprises two blades 7.

Figure 1C:
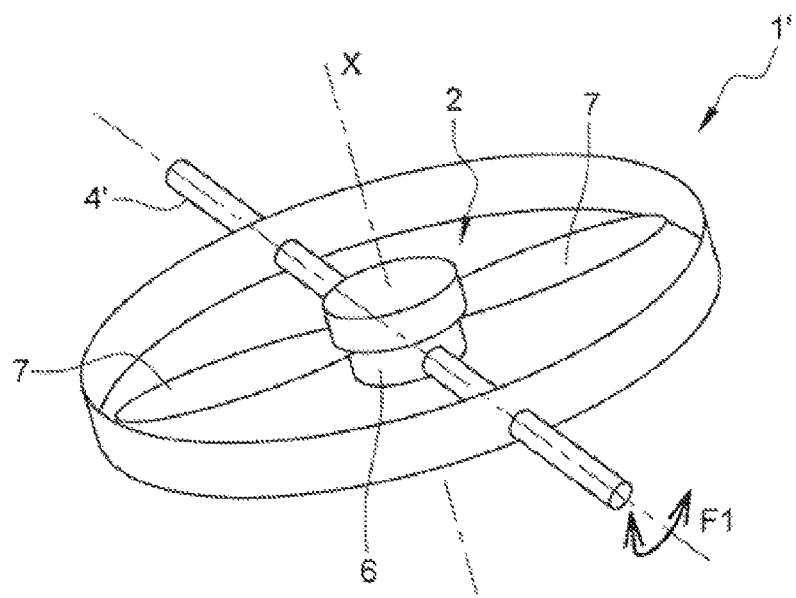
FIG. 1C is a schematic perspective view of a second embodiment of a propulsion system shown with a nacelle mounted on a through pivot axis, the propulsion system being in horizontal position.

FIG. 1C illustrates a second embodiment of an aircraft propulsion system 1' according to the invention in which the propulsion system 1' can be mounted on a pivot shaft 4', passing through the rotor 2 perpendicular to the axis of rotation X of the rotor 2. The rotor 2 of the propulsion system 1' is connected to the aircraft by a mast 5 supporting an engine 6, for example an electric motor, which drives the rotor 2 in rotation by means of a power shaft, in a manner known per se. According to the embodiment, the mast 5 of the rotor 2 is merged with the pivot shaft 4'.

Figure 2:
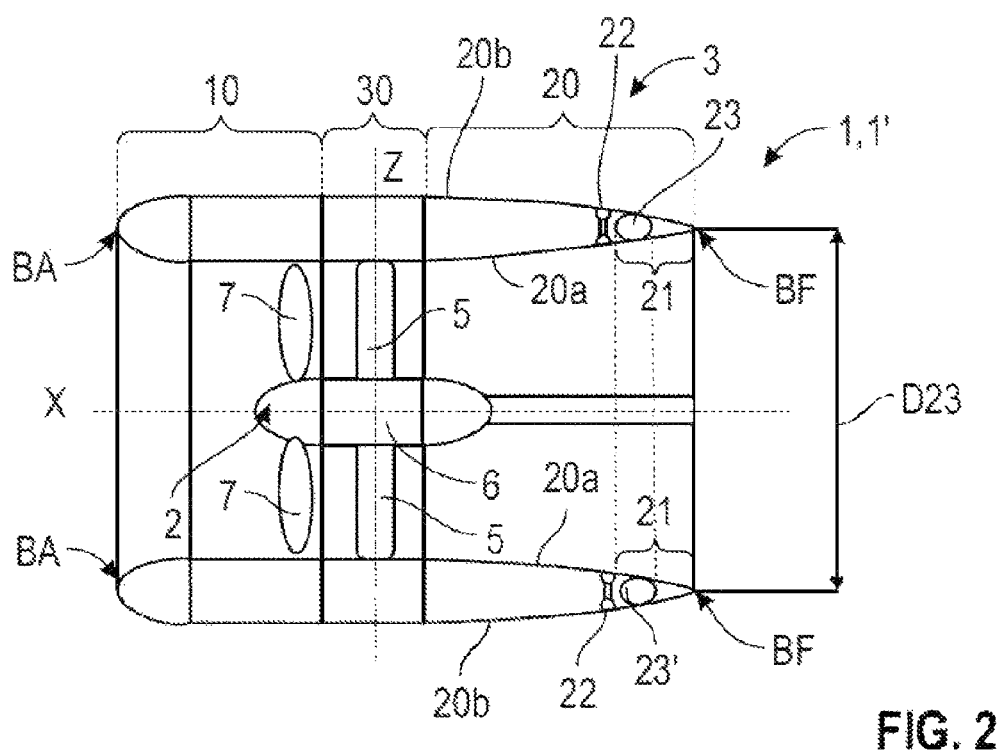
FIG. 2 is a schematic view in longitudinal cross-section of the propulsion system according to the invention with its downstream section of nacelle fairing in symmetrical thrust mode, i.e. axial thrust.
Figure 3:
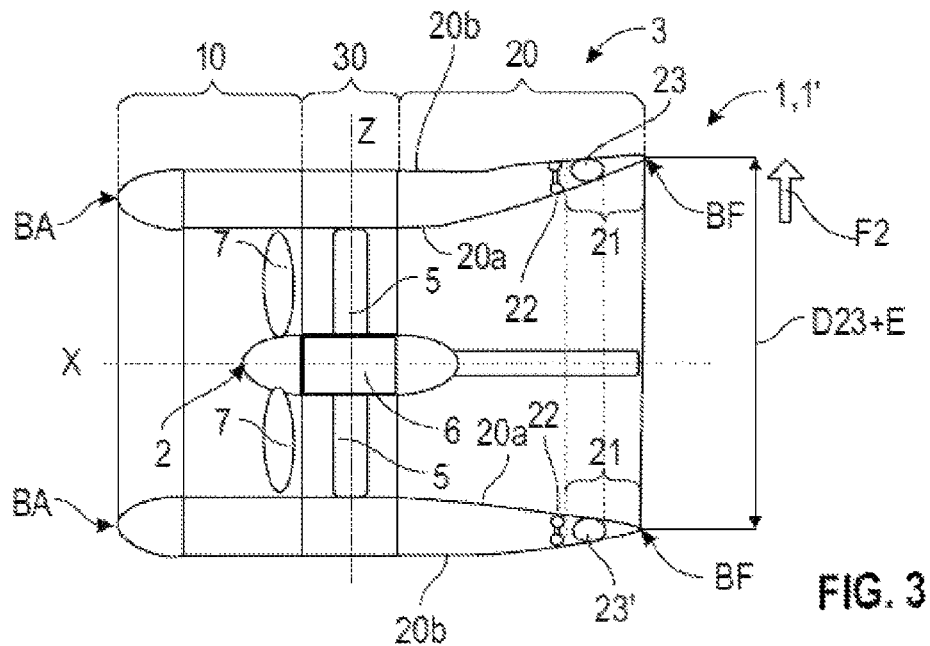
FIGS. 3 and 4 are views similar to FIG. 2 of the propulsion system according to the invention with its downstream section of nacelle fairing in asymmetric thrust mode.
Figure 4:
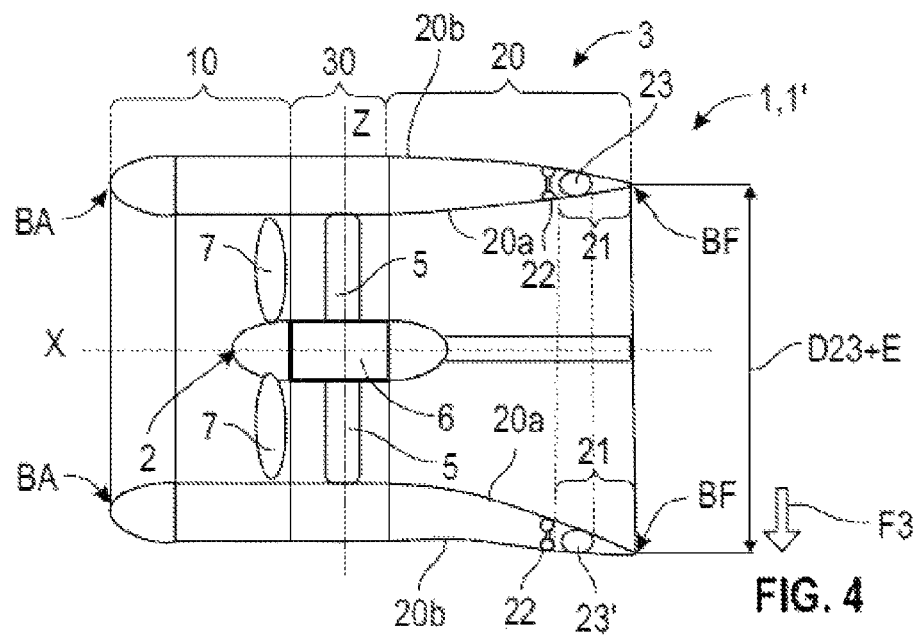

With reference to FIGS. 2 to 4, the nacelle fairing 3 of the propulsion system 1, 1' according to the invention comprises:
- an upstream section 10;
- a downstream section 20; and
- an intermediate section 30 connecting said upstream 10 and downstream 20 section.

The upstream section 10 forms an inlet cross-section (or in other words a leading edge) BA or air inlet of the nacelle fairing 3.

The upstream section 10 is made of a material that can withstand temperatures that make it suitable for anti-icing when supplied with hot air.

The intermediate section 30 is rigid. It is for example made of aluminium alloy, 6% aluminium and 4% vanadium filled titanium (TA6V), or carbon fibre composite with organic matrix. The intermediate section 30 is advantageously connected to the engine 6 of the propulsion system 1, 1' by at least one mast 5, and preferably by two masts 5 so as to mechanically fit the nacelle fairing 3 to the engine 6 of the propulsion system 1, 1'. The intermediate section 30 thus confers, by its material and its configuration, a shielding function to the propulsion system 1, 1'.

A downstream end 21 of the downstream section 20 forms an outlet cross-section (or in another word a trailing edge) BF or an air outlet of the nacelle fairing 3.

The downstream section 20 comprises a radially internal wall 20a and a radially external wall 20b. The radially internal 20a and radially external 20b walls of the downstream section 20 not only provide a structural function of the downstream section 20 but also an aerodynamic function.

The radially internal 20a and radially external 20b walls of the downstream section 20 are made of a semi-rigid deformable shape-memory material. In other words, the material constituting the radially internal 20a and radially external 20b walls of the downstream section 20 is both rigid to provide the downstream section 20 with a structural shape and flexible to provide the downstream section 20 with a deformability. Thus, the radially internal 20a and radially external 20b walls of the downstream section 20 are made of a material able to react under the effect of actuators as described below. When the radially internal 20a and radially external 20b walls of the downstream section 20 are energized by one or more actuators, the walls deform and when the energizing stress of the actuator or of the actuators stop, the walls return to their original shape. For example, the radially internal 20a and external 20b walls are made of a composite or a nickel-titanium alloy (also referred to as "Kiokalloy") such as NiTiNol or NiTiCu.

The shape-memory material constituting the radially internal 20a and external 20b walls is fail-safe, i.e. it is such that its rest position, in other words when no actuator acts on the shape-memory material to deform it, corresponds to a natural storage geometry of said material or to a longer duration of use. Thus, in case of failure of the actuator, the shape-memory material will return to its natural shape at rest and the nacelle fairing 3 will return to a safe geometry ensuring an axial thrust to ensure the proper operation of the propulsion system 1, 1' of the aircraft.

The radially internal 20a and external 20b walls may also have a varying thickness axially and also azimuthally in the vicinity of stiffening bridges 22 so as to locally modify the elasticity of the structure. It is also possible to locally optimize the mechanical characteristics of the shape memory material constituting the radially internal 20a and external 20b walls according to the desired local properties along the downstream section 20. Thus, it can be envisaged that the downstream section 20 consists of a plurality of sections of different materials.

The downstream section 20 is made of a deformable, semi-rigid material which guarantees a rigid structural shape so as to avoid its collapse both at rest and under the action of an air flow during operation of the propulsion system 1, 1' and thus allowing the nacelle fairing 3 to maintain a homogeneous aerodynamic profile of its outlet cross-section BF. Advantageously, the downstream end 21 of the downstream section 20 can be made of an orthotropic material with suitable elastic moduli.

The local elasticity of the radially internal 20a and radially external 20b walls of the downstream section 20 may vary as a function of the thickness or mechanical characteristics of the shape memory material, depending on the desired local deflections.

In addition, in order to ensure a substantially constant distance between the radially internal 20a and radially external 20b walls of the downstream section 20, stiffening bridges 22 are provided at regular angular intervals between these walls 20a, 20b.

One purpose of the present invention is to be able to benefit from a nacelle fairing 3 of the propulsion system 1, 1' whose output cross-section BF, as well as the shape of the latter, can be varied so as to direct the thrust of said propulsion system.

Thus, the downstream section 20 comprises means allowing for varying the shape of the outlet cross-section BF.

For this purpose, the downstream end 21 of the downstream section 20 forming the outlet cross-section BF of the nacelle fairing 3 comprises a plurality of pneumatic or hydraulic actuators 23, 23'. Each actuator 23, 23' has a general toroidal segment shape.

The actuators 23, 23' extend in different consecutive angular sectors about the axis X of rotation so that the set of the actuators 23, 23' have a general torus shape. The downstream end 21 of the downstream section 20 is thus divided into toroidal segments, each toroidal segment being associated with a generally toroidal segment-shaped actuator.

Each actuator 23, 23' is actuatable independently of the other actuators and is configured to deform in a direction that is radial to the axis X of rotation and angularly centred with respect to the angular sector over which it extends, under a predetermined command pressure. Thus, each actuator 23, 23' is configured to deform radially to the axis X the toroidal segment of the downstream end of the downstream section with which it is associated.

For this purpose, each actuator 23, 23' is connected to an automatic pneumatic or hydraulic device known per se (not shown) allowing for introducing or extracting a fluid into or from this actuator 23, 23' by application of a command pressure adapted according to the desired configuration for the nacelle fairing 3 to obtain the desired lateral thrust component. In particular, the automatic pneumatic or hydraulic device sends or extracts the fluid in an actuator 23, 23' independently of the other actuators.

Preferably and advantageously, each actuator 23, 23' is made of radially stiffened elastic material, for example by inclusion of fibres. For example, it is made of a polymer material incorporating an external device or inclusions stiffening it in the radial direction.

According to the embodiment illustrated in FIGS. 5A to 7B, the propulsion system 1, 1' comprises two actuators 23, 23' of semi-toroidal shape: a first actuator 23 extending in a first portion (the upper portion in the figures) of the downstream end 21 of the downstream section 20, and a second actuator 23' extending in a second portion (the lower portion in the figures) of the downstream end 21 of the downstream section 20. In the figures, the actuators are shown in the upper (top) portion and the lower (bottom) portion of the downstream section, but can of course be integrated in different angular sectors (for example on the right and left in the figures), these angular sectors depending on the orientation of the propulsion system when installed on the aircraft. The actuators 23, 23' are arranged to form a torus. Of course, the invention is by no means limited to this embodiment, and the propulsion system 1, 1' may comprise more actuators.

In these FIGS. 5A through 7B, each actuator 23, 23' comprises a generally semi-toroidal shaped bladder 23a, 23a' of flexible material encased in a spiral spring 23b, 23b'. Each spiral spring 23b, 23b' is embedded at one end in a rigid support 25 which has a structural function. Each spiral spring 23b, 23b' is thus held integral with the rigid support 25. The function of the spiral spring 23b, 23b' is to limit the radial expansion of the cross-section of the bladder 23a, 23a'. Each bladder 23a, 23a' is connected at each of its ends to the rigid support 25. The actuator 23, 23' is thus firmly fitted to the rigid support 25. Another embodiment could be the use of an orthotropic material with a larger elastic modulus in a radial direction than in an azimuthal direction.

Each bladder 23a, 23a' comprises an inlet valve 27, 27' configured to receive the predetermined command pressure. The inlet valve 27, 27' can for example be a solenoid valve.

Each actuator 23, 23' is configured so that, when subjected to an increase in pressure, this results in a local deformation, i.e. a radial and local expansion E, of the torus formed by the set of the actuators. The outlet cross-section of the fairing is therefore asymmetrical, and its shape results from the mechanical characteristics of the structure subjected to the thrust of the bladder 23a, 23a'. When an actuator 23, 23' is activated, the dimension along the axis X of the toroidal cross-section of the activated actuator varies little compared to the radial expansion, the result of which creates a local deflection of the structure on the side of the activated actuator.

FIG. 2 shows a propulsion system 1, 1' according to the invention with the nacelle fairing 3 shown in the neutral position, i.e. pure axial thrust. FIGS. 5A and 5B show the actuators 23, 23' in this neutral position. Each actuator 23, 23' is subjected to a command pressure substantially equal to an ambient pressure between the radially internal 20a and external 20b walls of the downstream section 20 of the nacelle fairing 3. The local deformation of the actuators 23, 23' is then zero. The set of the actuators 23, 23' forms a torus centred on the axis X.

FIG. 3 represents a propulsion system 1, 1' according to the invention in which the nacelle fairing 3 is shown in a position in which the flow is diverted upwards. FIGS. 6A and 6B show the actuators 23, 23' in this asymmetric downward thrust position. A command to create lateral downward displacement of the nacelle requires deforming the outlet cross-section of the nacelle upward, so as to create a force directed from the top down. The actuator 23 is operated to radially deform the bladder 23a. A pressure setpoint is calculated based on the flight command input and then sent through the valve 27 into the bladder 23a. The bladder 23a is deformed in a radial direction (arrow F2 in FIGS. 3 and 6A) with respect to the axis X of rotation and angularly centred with respect to the angular sector α over which the actuator 23 extends, i.e., vertically and upward in FIG. 6A. The actuator 23 is therefore subjected to a command pressure greater than the ambient pressure between the radially internal 20a and external 20b upper walls of the downstream section 20 of the nacelle fairing 3. The actuator 23', on the other hand, is subjected to a command pressure substantially equal to an ambient pressure between the radially internal 20a and external 20b lower walls of the downstream section 20 of the nacelle fairing 3. In other words, the actuator 23' is in the rest position. Thus, the external radius R23' of the semi-torus formed by the actuator 23' is equal to half the radial dimension D23 of the set of the actuators 23, 23' at rest. However, the radial dimension of the semi-torus formed by the actuator 23 is equal to the sum of the external radius R23 of the actuator 23 at rest and of the expansion E. The actuator 23', being at rest, keeps its semi-toroidal shape, while the actuator 23, being activated, deforms (into a semi-elliptical shape, for example, as in FIG. 6A). The set of the actuators 23, 23' form a non-axisymmetrical ring, one portion of which (here the upper portion) has a radial deformation.

Figure 7A:
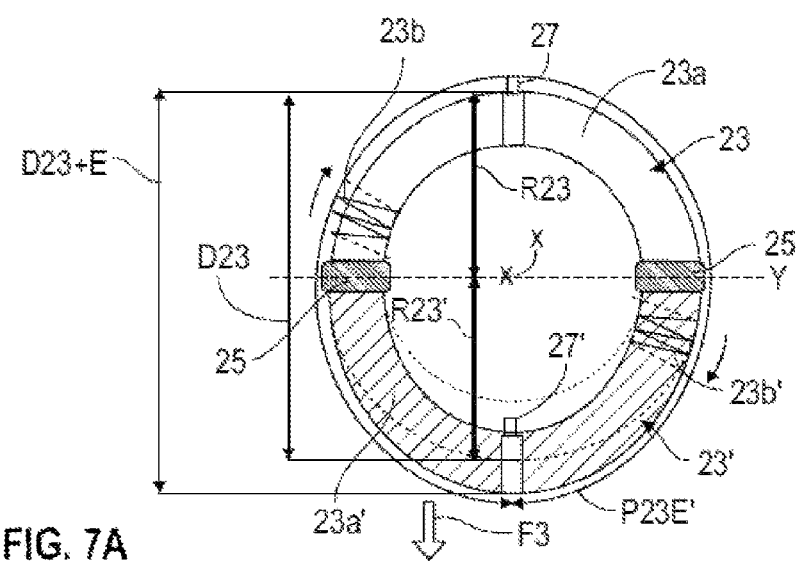
FIGS. 7A and 7B are schematic rear and side views, respectively, of another embodiment of the semi-toroidal actuators according to the invention, in asymmetric thrust mode.
Figure 7B:
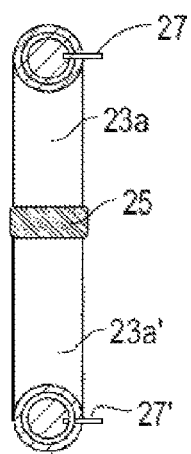

FIG. 4 shows a propulsion system 1, 1' according to the invention with the nacelle fairing 3 shown in a position where the flow is deflected downwards. FIGS. 7A and 7B show the actuators 23, 23' in this asymmetric upward thrust position. A command to create a lateral upward displacement of the nacelle requires deforming the output cross-section of the nacelle downward, so as to create a force directed from the bottom up. The actuator 23' is operated to radially deform the bladder 23a'. A pressure setpoint is calculated based on the flight command input and then sent through the valve 27' into the inlet of the bladder 23a'. The bladder 23a' is deformed in a radial direction (arrow F3 in FIGS. 4 and 7A) with respect to the axis X of rotation and angularly centred with respect to the angular sector ß over which the actuator 23' extends, i.e., vertically and downward in FIG. 7A. The lower actuator 23' is therefore subjected to a command pressure greater than the ambient pressure between the radially internal 20a and external 20b lower walls of the downstream section 20 of the nacelle fairing 3. In turn, the actuator 23 is subjected to a command pressure substantially equal to an ambient pressure between the radially internal 20a and external 20b upper walls of the downstream section 20 of the nacelle fairing 3. In other words, the actuator 23 is in the rest position. Thus, the external radius R23 of the semi-torus formed by the actuator 23 is equal to half the radial dimension D23 of the set of the actuators 23, 23' at rest. However, the radial dimension of the semi-torus formed by the actuator 23' is equal to the sum of the external radius R23' of the actuator 23' at rest and of the expansion E. The actuator 23, being at rest, maintains its semi-toroidal shape, while the actuator 23', being activated, deforms (into a semi-elliptical shape, for example, as in FIG. 7A). The set of the actuators 23, 23' form a non-axisymmetrical ring, one portion of which (here the lower portion) has a radial deformation.

The gradual increase in the command pressure induced by the automatic pneumatic or hydraulic device gradually changes the shape and size of the outlet cross-section BF. In particular, there is a deformation, radially to the axis X and locally, of the radially internal 20a and radially external 20b walls made of deformable shape memory material of the downstream section 20 associated with the actuator. This, in turn, varies the size and the shape of the outlet cross-section BF, which thus changes from a minimum radial dimension D23 and a circular shape in the axial thrust mode configuration as shown in FIG. 2 to a radial dimension D23+E greater than the minimum radial dimension D23, with a deformation of the outlet cross-section BF in at least one radial direction in the asymmetric thrust mode configuration of the nacelle fairing 3 as shown in FIGS. 3 and 4.

Similarly, the gradual reduction in the command pressure induced by the automatic pneumatic or hydraulic device gradually shifts the nacelle fairing 3 from an asymmetric thrust mode configuration as shown in FIGS. 3 and 4 to an axial thrust mode configuration as shown in FIG. 2.

The passage from the configuration of FIG. 5A to the configuration of FIG. 6A or FIG. 7A of the downstream section 20 of the nacelle fairing 3, and vice versa, is done continuously as a function of the command pressure induced by the automatic pneumatic or hydraulic device, the stiffening bridges 22 ensuring a substantially constant distance between the radially internal 20a and radially external 20b walls of the downstream section 20 during the changes of configuration of the outlet cross-section BF (dimensions and shape) (in other words of the outlet cross-section) of the nacelle fairing 3.

The invention has primarily been described for a propulsion system comprising two semi-toroidal shaped actuators, but the propulsion system can of course comprise more actuators shaped as toroidal segments at rest.

The invention claimed is:

1. A propulsion system for an aircraft, comprising:
   at least one rotor and a nacelle fairing extending around said at least one rotor with respect to an axis of rotation of said rotor, the nacelle fairing comprising an upstream section forming an inlet cross-section of the nacelle fairing and a downstream section, a downstream end of which forms an outlet cross-section of the nacelle fairing; and
   wherein the downstream section comprises a radially internal wall and a radially external wall made of a deformable shape-memory material and in that the downstream end forming the outlet cross-section comprises a plurality of pneumatic or hydraulic actuators, each actuator of the plurality of actuators being independently actuatable and extending in different consecutive angular sectors about said axis of rotation, and configured to deform in a direction which is radial with respect to the axis of rotation and which is angularly centered with respect to the angular sector over which each said actuator extends under a predetermined command pressure, and
   wherein each actuator comprises a bladder in a general form of a toroidal segment of flexible material encased in a spiral spring.

2. The propulsion system according to claim 1, wherein each actuator has a general shape of a toroidal segment, the actuators extending in different consecutive angular sectors about said axis of rotation so that a set of actuators of the plurality of actuators has a general torus shape.

3. The propulsion system according to claim 1, wherein each actuator is made of radially stiffened elastic material including fibres.

4. The propulsion system of claim 1, wherein each actuator is embedded at one end in a rigid support.

5. The propulsion system according to claim 1, wherein each bladder comprises an inlet valve configured to receive the predetermined command pressure.

6. The propulsion system according to claim 5, wherein said inlet valve is a solenoid valve.

7. The propulsion system according to claim 1, wherein the plurality of actuators comprises at least two actuators having a general semi-toroidal shape.

8. The propulsion system according to claim 1, further comprising stiffening bridges connecting the radially internal and radially external walls of the downstream section.

9. The propulsion system according to claim 1, wherein the nacelle fairing further comprises an intermediate section connecting the upstream and downstream sections, and wherein the intermediate section is rigid and is connected by at least one mast to an engine of the propulsion system.

* * * * *